(12) United States Patent
Sears et al.

(10) Patent No.: US 8,454,231 B2
(45) Date of Patent: Jun. 4, 2013

(54) MOUNTING STRUCTURE FOR A SENSOR

(75) Inventors: Merle D. Sears, Mooresville, IN (US); William Bruce Sutherlin, Indianapolis, IN (US)

(73) Assignee: Carrier Corporation, Farmington, CT (US)

( * ) Notice: Subject to any disclaimer, the term of this patent is extended or adjusted under 35 U.S.C. 154(b) by 1153 days.

(21) Appl. No.: 12/376,684

(22) PCT Filed: Aug. 9, 2006

(86) PCT No.: PCT/US2006/030949
§ 371 (c)(1),
(2), (4) Date: Feb. 6, 2009

(87) PCT Pub. No.: WO2008/018868
PCT Pub. Date: Feb. 14, 2008

(65) Prior Publication Data
US 2010/0176912 A1    Jul. 15, 2010

(51) Int. Cl.
*G01K 1/14* (2006.01)
*G01K 7/22* (2006.01)

(52) U.S. Cl.
USPC ........... 374/185; 374/208; 374/163; 702/130; 73/866.5

(58) Field of Classification Search
USPC ................ 374/100, 208, 163, 183, 120, 185, 374/179; 73/866.5, 855, 856, 860; 338/25, 338/22 R; 702/130, 132–136; 116/216
See application file for complete search history.

(56) References Cited

U.S. PATENT DOCUMENTS

| | | | |
|---|---|---|---|
| 2,270,211 A * | 1/1942 | Bruns | 374/208 |
| 2,475,211 A * | 7/1949 | Winning | 374/194 |
| 4,014,178 A | 3/1977 | Kells | |
| 4,092,698 A | 5/1978 | Brefka | |
| 4,148,194 A | 4/1979 | Kells | |
| 4,404,813 A * | 9/1983 | Paddock et al. | 62/127 |
| 4,445,455 A * | 5/1984 | Cannon | 116/216 |
| 4,507,935 A | 4/1985 | Madarame et al. | |
| 5,342,126 A * | 8/1994 | Heston et al. | 374/208 |
| 5,439,169 A * | 8/1995 | Rabel | 236/94 |
| 6,101,819 A | 8/2000 | Onaka et al. | |
| 6,746,150 B2 * | 6/2004 | Wienand et al. | 374/208 |
| 7,785,003 B2 * | 8/2010 | Blichmann | 374/208 |
| 7,785,004 B2 * | 8/2010 | Kautz et al. | 374/208 |
| 7,967,506 B2 * | 6/2011 | Paramasivam et al. | 374/208 |
| 2005/0058179 A1 * | 3/2005 | Phipps | 374/208 |
| 2008/0298431 A1 * | 12/2008 | Kautz et al. | 374/208 |

OTHER PUBLICATIONS

Official Search Report of the Patent Cooperation Treaty in counterpart foreign Application No. PCT/US2006/030949, filed Aug. 9, 2006.

* cited by examiner

*Primary Examiner* — Gail Verbitsky
(74) *Attorney, Agent, or Firm* — Cantor Colburn LLP

(57) ABSTRACT

A mounting structure (34) for receiving a sensor (18) having a sensing portion (26) and a base portion (30) includes a substantially flat sheet of material (20) having a first surface (20*a*), a second surface (20*b*) opposite the first surface (20*a*), and an aperture (36). The aperture (36) is configured such that the sensing portion (26) of the sensor (18) is passable through the aperture (36), and the base portion (30) is not passable through the aperture (36), but instead rests on the first surface (20*a*). The mounting structure (34) also includes a pair of tabs (38) that extend in a downward direction away from the second surface (20*b*) of the sheet of material (20) and are configured to immobilize the sensor (18) within the aperture (36).

13 Claims, 6 Drawing Sheets

MOUNTING STRUCTURE FOR A SENSOR

BACKGROUND OF THE INVENTION

The present invention relates generally to a mounting structure for securing a sensor. More particularly, the present invention relates to a mounting structure for receiving and securing a sensor to a control box of a condensing unit.

A split system heating and/or cooling system includes an outdoor unit, such as a condensing unit, and an indoor unit, such as an evaporator unit. For operation of the condensing unit, an outdoor ambient air temperature is sensed by a temperature sensor, such as a thermistor, and electrically transmitted to a controller of the unit located within a control box.

In some designs, if the thermistor is located outside of a control box of the condensing unit, the thermistor may be exposed to the sun and thus may provide inaccurate temperature data. In other designs, the thermistor may be located inside the condensing unit, in part to avoid exposure to the sun. In that case, the thermistor may be exposed to warmer air circulating through a coil assembly inside the condensing unit and/or heat given off by a compressor inside the condensing unit, both of which may result in an inaccurate temperature reading. In some designs, the thermistor may be fastened to the inside of the condensing unit through the use of wire ties, which may be labor intensive, and again, may result in inaccurate temperature data.

There is a need for a temperature sensor locatable in a position to accurately measure an outside ambient air temperature, yet be easily mounted to a part of the condensing unit such that the sensor is secure and under minimal strain.

BRIEF SUMMARY OF THE INVENTION

The present invention is a mounting structure for receiving a sensor having a sensing portion and a base portion. The mounting structure includes a substantially flat sheet of material having a first surface, a second surface opposite the first surface, and an aperture configured such that the sensing portion of the sensor is passable through the aperture, and the base portion is not passable through the aperture, but rests on the first surface. The mounting structure also includes a pair of tabs that extend in a downward direction away from the second surface of the sheet of material and are configured to immobilize the sensor within the aperture.

DETAILED DESCRIPTION

Figure 1A:
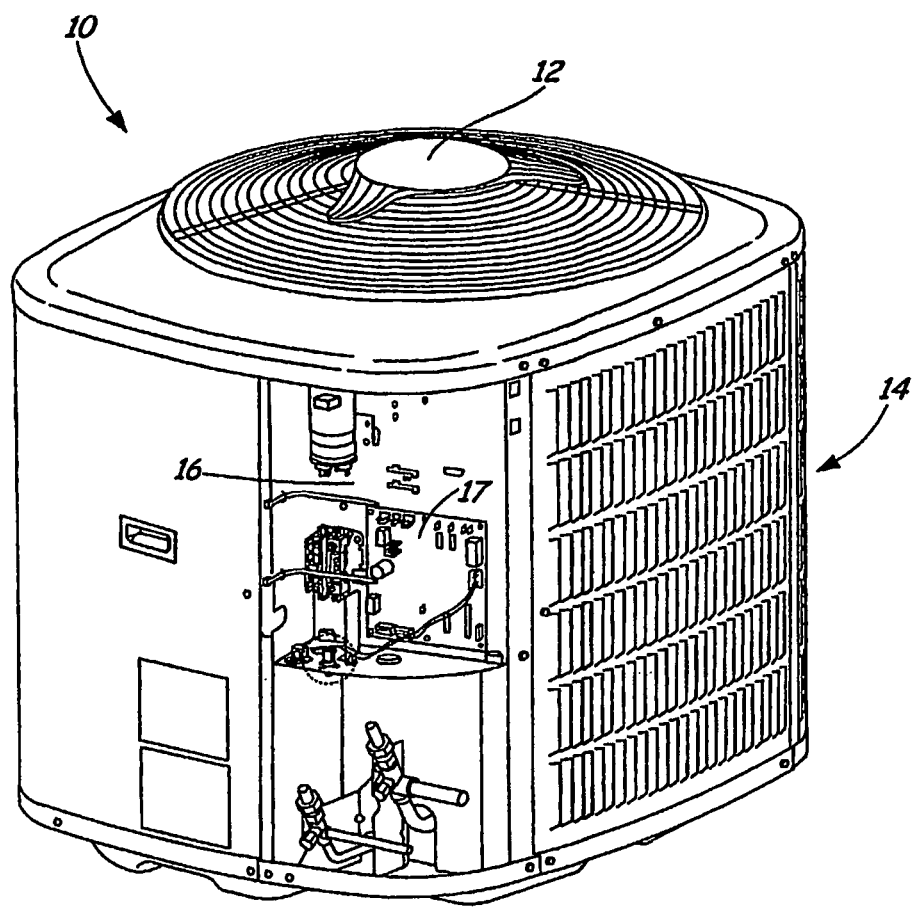
FIG. 1A is a perspective view of a condensing unit with a cover removed from a control box of the unit.

The present invention is a structure and method for mounting a sensor (such as a thermistor) to a surface (such as a wall or plate of a control box or housing). FIG. 1A is a perspective view of condensing unit 10 of an air conditioning or heat pump system. Condensing unit 10 is shown to aid in the description of the present invention and is not intended to limit the scope of the present invention. Condensing unit 10 includes fan 12, coil assembly 14, and control box 16.

When condensing unit 10 is used as part of an air conditioning unit, fan 12 draws air from outside condensing unit 10 across coil assembly 14. Refrigerant is enclosed in tubing used to form a coil in coil assembly 14. As the refrigerant passes through the coil of coil assembly 14 and the cooler air from outside condensing unit 10 passes across coil assembly 14, the air absorbs heat from coil assembly 14, which causes the refrigerant to condense. The resulting cooled liquid refrigerant then flows to an evaporator, which is part of a corresponding indoor unit, and the evaporator utilizes the refrigerant to cool air. When condensing unit 10 is used as part of a heat pump system, coil assembly 14 acts as an evaporator coil to extract heat from the surrounding air.

Condensing unit 10 includes control box 16. As shown in FIG. 1A, a cover (not shown) has been removed from control box 16. Control box 16 includes circuit board 17 which controls an overall operation of outdoor condensing unit 10 and the corresponding indoor unit.

Figure 1B:
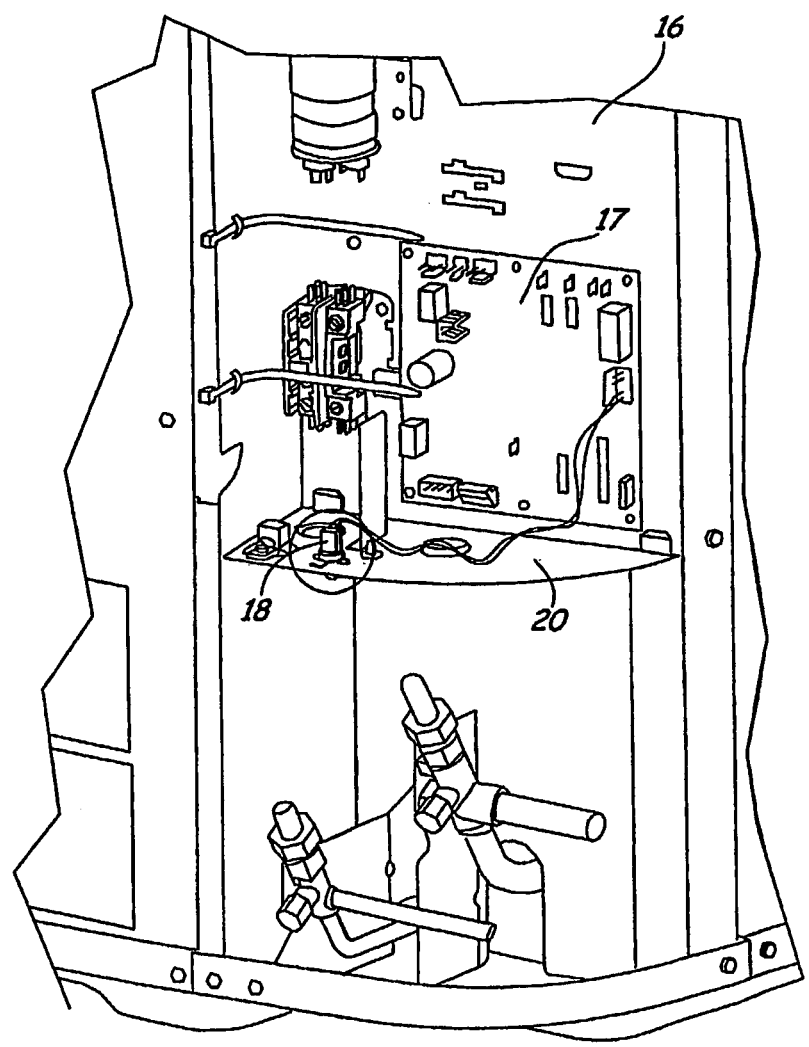
FIG. 1B is an enlarged view of a portion of the control box from FIG. 1A illustrating a thermistor secured within the control box.

FIG. 1B is an enlarged view of control box 16 from FIG. 1A. Control box 16 includes thermistor 18, which is secured within an aperture or cut-out in bottom wall 20 of control box 16. Thermistor 18 is configured to measure an ambient air temperature, and includes wires 22 which are also connected to circuit board 17 in order to relay signals from thermistor 18 to circuit board 17. Additional wires may be connected to circuit board 17 to connect various other components of unit 10 to circuit board 17; for clarity these other wires have not been shown in FIGS. 1A-1C.

Figure 1C:
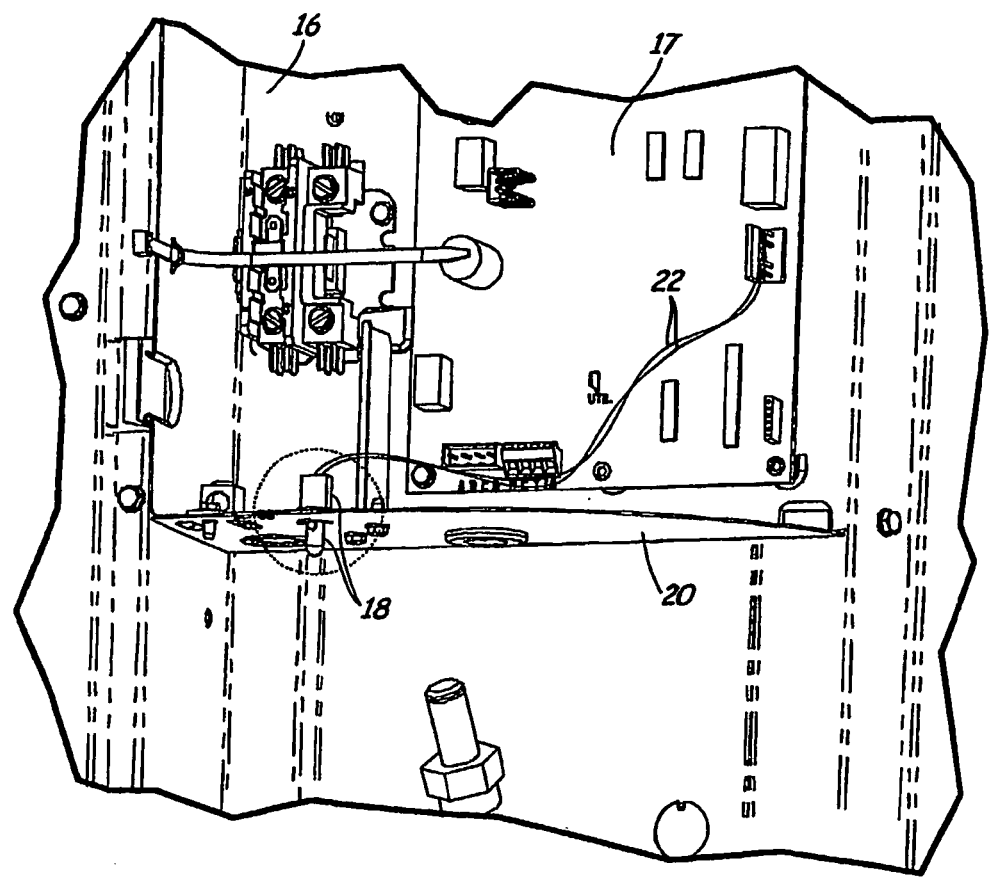
FIG. 1C is a perspective bottom view of the thermistor and the control box from FIG. 1B.

FIG. 1C is a perspective bottom view of control box 16 and thermistor 18 from FIG. 1B. As explained in more detail below, thermistor 18 is configured such that a portion of thermistor 18 is inserted through the cut-out in bottom wall 20 and extends outside of control box 16, and another portion resides inside control box 16. The portion of thermistor 18 extending outside of control box 18 includes a sensing portion of thermistor 18, and as such, thermistor 18 is able to obtain accurate temperature measurements of the outside ambient air. Because of its location extending out of a bottom of control box 16, thermistor 18 is generally shielded from the sun and has minimal solar gain.

Figure 2:
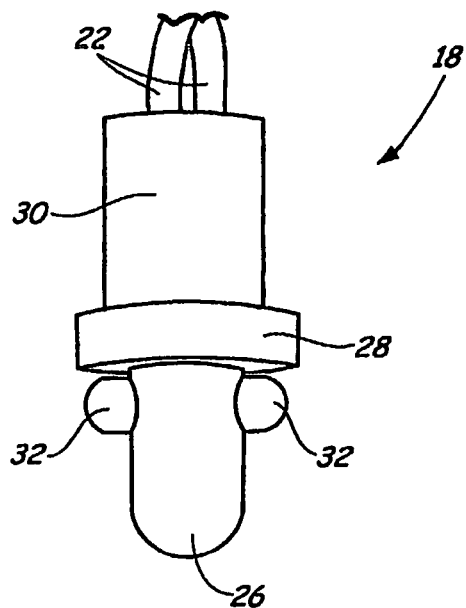
FIG. 2 is a perspective view of the thermistor of FIGS. 1A-1C.

FIG. 2 is a perspective view of thermistor 18 from FIGS. 1A-1C. In the exemplary embodiment shown in FIG. 2, thermistor 18 includes sensor portion 26, shoulder 28, base portion 30, wires 22 extending from base portion 30, and pair of ears 32 extending from sensor portion 26.

Figure 3:
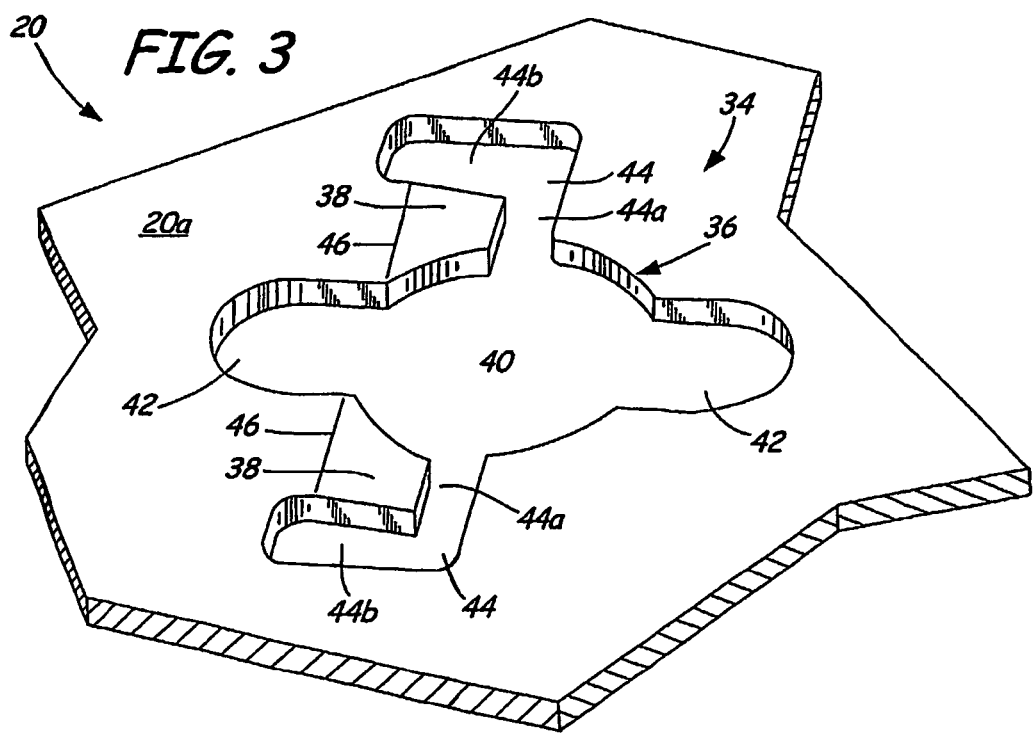
FIG. 3 is a perspective top view of a bottom wall of the control box of FIG. 1A to illustrate an aperture in the wall configured for receiving and securing the thermistor of FIG. 1.

FIG. 3 is a perspective top view of a portion of bottom wall 20 of control box 16 of FIG. 1A to illustrate mounting structure 34 including aperture or cut-out 36 and a pair of tabs 38. Mounting structure 34 is configured for securing thermistor 18 to control box 16 such that sensor portion 26 of thermistor 18 is exposed to outside ambient air and thermistor 18 is immobile, yet under little or no strain. Bottom wall 20 includes top surface 20a and bottom surface 20b (not visible in FIG. 3).

In the exemplary embodiment shown in FIG. 3, cut-out 36 includes generally circular portion 40, a pair of oblong portions 42, and a pair of L-shaped portions 44. Each L-shaped portion 44 has short leg 44a and tall leg 44b. Tabs 38 are each formed from a portion of wall 20 remaining inside and between L-shaped portions 44 and circular portion 40 and are defined by a bend or crease 46 formed in wall 20. Tabs 38 are each bent downward extending away from bottom surface 20b of wall 20. In preferred embodiments, tabs 38 are spring-like and resilient. In their natural position, tabs 38 are bent downward; however, if an upward force is applied to tabs 38, tabs 38 are movable such that they are generally flush with wall 20. Once a force is no longer exerted on tabs 38, tabs 38 may return to their original downward-bent orientation.

Circular portion 40 of cut-out 36 is configured to receive sensor portion 26 of thermistor 18 and oblong portions 42 are configured to each receive one of ears 32 of sensor portion 26.

In preferred embodiments, wall 20 of control box 16 may be formed from sheet metal. However, it is recognized that any other suitable material may also be used to form wall 20. Mounting structure 34 may be formed in wall 20 using any metal cutting technique, including, but not limited to, stamping. In the embodiment of FIG. 3, a die may be used to punch out the features of cut-out 36, and in a secondary operation using the same die, tabs 38 may be formed and bent downward.

Figure 4:
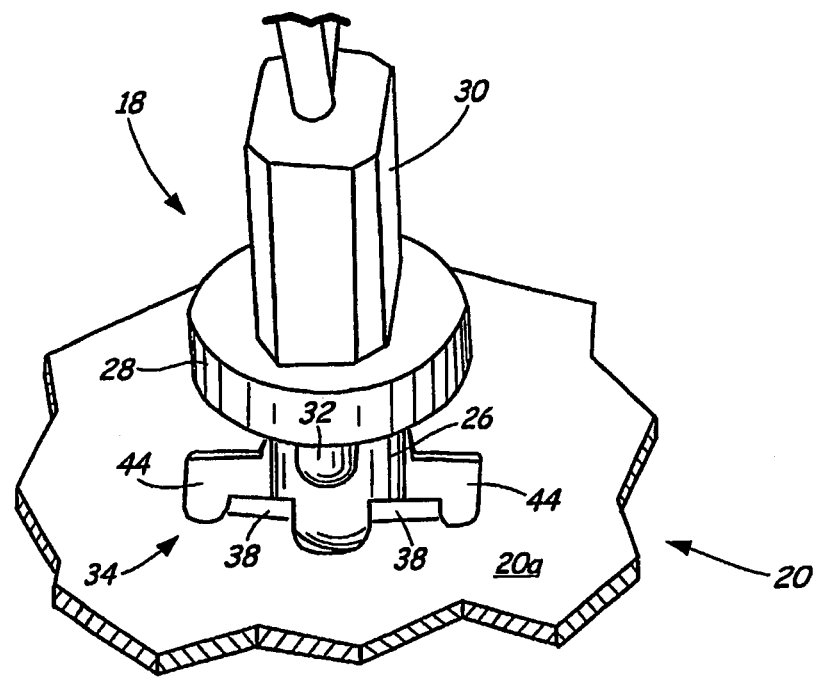
FIG. 4 illustrates a process of inserting the thermistor of FIG. 2 into the aperture of FIG. 3.

FIG. 4 is a perspective top view of top surface 20a of wall 20, including mounting structure 34 from FIG. 3 (rotated counter-clockwise approximately 90 degrees), and thermistor 18 from FIG. 2. FIG. 4 illustrates a step in the process of inserting thermistor 18 through cut-out 36. Thermistor 18 may be placed above top surface 20a of wall 20 such that ears 32 of sensor portion 26 are aligned with oblong portions 42 of cut-out 36. Sensor portion 26 including ears 32 are then received through cut-out 36 such that sensor portion 26 extends below bottom surface 20b (not shown in FIG. 4) of wall 20. In the exemplary embodiment shown in FIGS. 1-4, thermistor 18 and cut-out 36 are configured such that shoulder 28 of thermistor 18 is larger than circular portion 40; thus, shoulder 28 is unable to pass through cut-out 36. Instead, shoulder 28 rests on top surface 20a of wall 20.

Thermistor 18 may then be rotated 90 degrees in either direction by gripping and rotating base portion 30. As thermistor 18 is rotated and ears 32 of sensor portion 26 pass under tabs 38, ears 32 exert an upward force on resilient tabs 38, thus pushing tabs 38 up towards wall 20. Once thermistor 18 is rotated enough such that ears 32 are past tabs 38, ears 32 will each be generally aligned with each short leg 44a of L-shaped portions 44. Resilient tabs 38 then spring back to their original downward-bent position and lock ears 32 such that thermistor 18 is no longer able to rotate. Thermistor 18 is thus fixed within cut-out 36.

Figure 5:
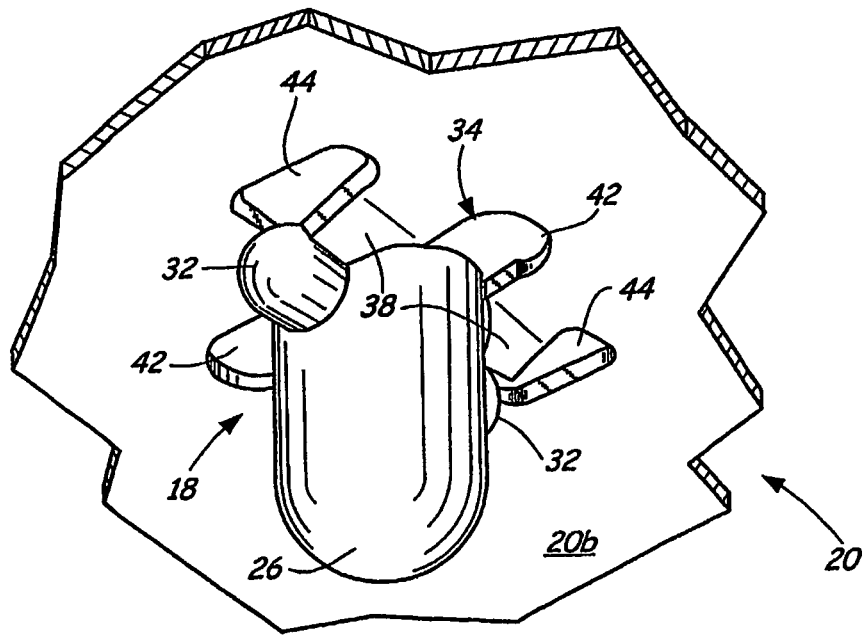
FIG. 5 illustrates a process of securing the thermistor within the aperture.

FIG. 5 is a perspective view of bottom surface 20b of wall 20 with thermistor 18 and mounting structure 34. As shown in FIG. 5, ears 32 of sensor portion 26 are aligned with short legs 44a of L-shaped portions 44 and tabs 38 are bent such that tabs 38 prevent movement by ears 32. Rotation of thermistor 18 in either direction (i.e. clockwise or counterclockwise) is prevented because of the pair of tabs 38.

Figure 6:
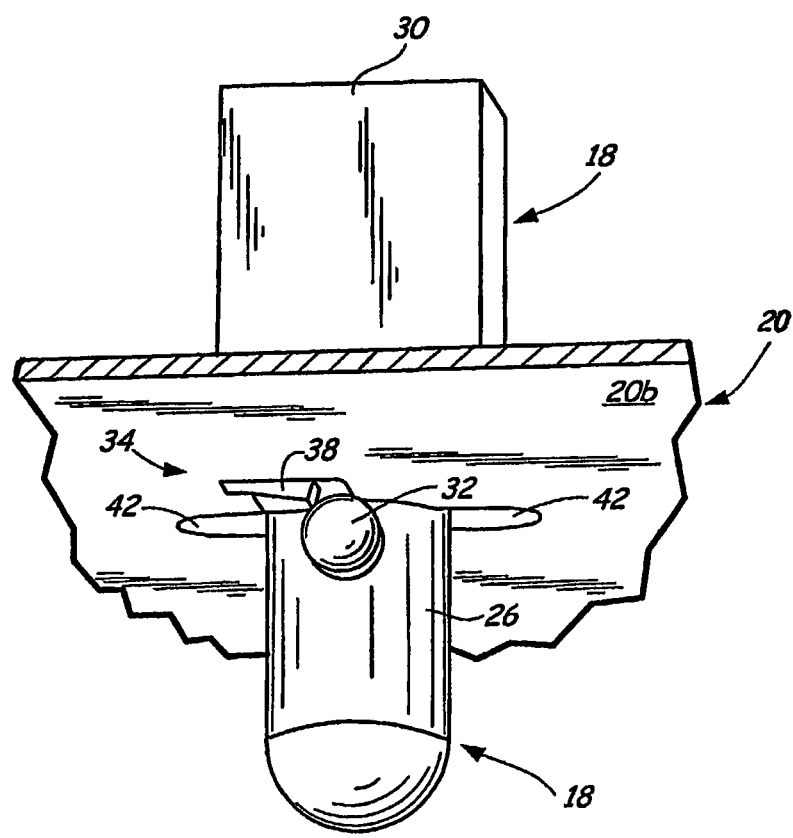
FIG. 6 is a perspective bottom view of the thermistor once it is secure inside the aperture.

FIG. 6 is another perspective view of thermistor 18 and mounting structure 34 of FIG. 5. As explained above and as illustrated in FIG. 6, because tabs 38 are bent downward and contact ears 32, thermistor 18 is locked in place within bottom wall 20 of control box 16. With the use of mounting structure 34, fasteners are not needed to secure thermistor 18 within wall 20. Thermistor 18 is easily mounted to wall 20 by inserting sensor portion 26 through cut-out 36 and then locking thermistor 18 in place with a quarter-turn twist (in either direction). Thermistor 18 is adequately fixed to wall 20 but is not under any strain.

Sensor portion 26 of thermistor 18 extends below bottom surface 20b of wall 20 of control box 16. Sensor portion 26 is exposed to outside air, thus enabling thermistor 18 to provide an accurate ambient air temperature for efficient operation of condensing unit 10. Moreover, because of its position extending from a bottom of control box 16, sensor portion 26 is also shielded from any solar effects that may impact sensor portion 26 and its ability to provide an accurate temperature reading.

In the preferred embodiment of thermistor 18 and mounting structure 34, as shown in FIGS. 1-6, thermistor 18 may be easily removed from mounting structure 34 if removal is necessary (i.e. for maintenance or replacement of thermistor 18). A small device, such as a screwdriver or knife, may be inserted between tab 38 and ear 32 (of FIG. 6) to temporarily push tab 38 upward towards wall 20. Thermistor 18 may then be rotated 90 degrees clockwise until ears 32 are aligned with oblong portions 42 and sensor portion 26 may be lifted back out through cut-out 36. If the device were instead inserted between the opposite tab 38 and corresponding ear 32 (neither of which is visible in FIG. 6), in that case, thermistor 18 may be rotated 90 degrees counter-clockwise in order to back thermistor 18 out of cut-out 36. Thermistor 18 may be easily removed without any damage to itself or to mounting structure 34.

The present invention relates to a mounting structure for a sensor or similar component. Although the present invention has been described above in relation to a thermistor for a control box of an outdoor condensing unit, it is recognized that the mounting structure could be used in various other applications where it is critical or desirable to easily mount a sensor or other small component without the use of additional fasteners.

Although the present invention has been described with reference to preferred embodiments, workers skilled in the art will recognize that changes may be made in form and detail without departing from the spirit and scope of the invention.

The invention claimed is:

1. A mounting structure for receiving a sensor having a sensing portion and a base portion, the mounting structure comprising:
   a substantially flat sheet of material having a first surface;
   a second surface opposite the first surface; and
   an aperture, wherein the aperture is configured such that the sensing portion of the sensor is passable through the aperture, the base portion is not passable through the aperture, and the base portion is configured to rest on the first surface; and
   a pair of tabs that extend in a downward direction away from the second surface of the sheet of material, wherein the pair of tabs are configured to immobilize the sensor within the aperture;
   wherein the aperture includes a generally circular portion, a pair of oblong portions extending from opposite ends of the generally circular portion, and a pair of L-shaped portions extending from the generally circular portion and positioned approximately 90 degrees from each of the oblong portions.

2. The mounting structure of claim 1 wherein the sensor is a thermistor used to measure an outdoor ambient air temperature.

3. The mounting structure of claim 1 wherein the mounting structure is part of a control unit of a condensing unit.

4. The mounting structure of claim 1 wherein the mounting structure is formed from sheet metal.

5. The mounting structure of claim 1 wherein the base portion of the sensor includes a shoulder configured to rest on the first surface of the sheet of material.

6. An assembly comprising:
a thermistor having a sensor portion, a base portion, and a pair of ears extending from opposite sides of the sensor portion; and
a mounting structure comprising:
a wall having a top surface, a bottom surface, and a cut-out for receiving and securing the thermistor, wherein the wall is substantially flat; and
a pair of tabs that extend from the bottom surface of the wall in a downward direction, wherein the cut-out of the wall is configured such that the base portion of the thermistor is secured on the top surface above the wall and the sensor portion of the thermistor is secured below the wall, and the pair of tabs engage with the pair of ears to secure the thermistor to the mounting structure;
wherein the cut-out includes a generally circular portion and a pair of oblong portions extending from opposite ends of the generally circular portion, wherein the oblong portions are configured for receiving the ears on the sensor portion of the thermistor;
wherein the cut-out further includes a pair of L-shaped portions extending from opposite ends of the generally circular portion and positioned approximately 90 degrees from each of the oblong portions.

7. The assembly of claim 6 wherein the base portion of the thermistor includes a shoulder configured to rest on the top surface of the wall.

8. The assembly of claim 6 wherein the mounting structure is formed from sheet metal.

9. The assembly of claim 6 wherein the mounting structure is part of a controller of a condensing unit and the thermistor is configured for measuring an outdoor ambient air temperature, 10. A method of attaching a sensor to a wall of a control unit, wherein the wall is a substantially flat sheet of material having a top surface and a bottom surface, the method comprising:
forming an aperture in the sheet;
forming a locking feature from a portion of the sheet;
inserting a first portion of the sensor through the aperture;
preventing a second portion of the sensor from passing through the aperture; and
rotating the sensor to lock the sensor within the aperture;
wherein the aperture includes a main portion configured for receiving the first portion of the sensor, a pair of oblong portions configured for receiving a pair of protrusions extending from the first portion of the sensor, and a pair of L-shaped portions positioned approximately 90 degrees from each of the oblong portions and configured for receiving the pair of protrusions after the sensor is rotated approximately 90 degrees.

11. The method of claim 10 wherein forming the locking feature includes a pair of tabs bent in a downward direction away from the bottom surface of the sheet.

12. The method of claim 10 wherein rotating the sensor includes at least one of rotating the sensor 90 degrees clockwise or rotating the sensor 90 degrees counter-clockwise.

13. The method of claim 10 wherein preventing the second portion of the sensor from passing through the aperture is performed by a shoulder located between the first portion and the second portion of the sensor.

* * * * *